Patented Apr. 26, 1949

2,468,138

UNITED STATES PATENT OFFICE 2,468,138

AUTOMATIC TEMPERATURE CONTROLLER, MILLIVOLTMETER TYPE

Richard A. Terry, Philadelphia, Pa.

Application December 15, 1944, Serial No. 568,367

4 Claims. (Cl. 236—69)

(Granted under the act of March 3, 1883, as amended April 30, 1928; 370 O. G. 757)

This invention relates to a safety stop for furnaces preventing their operation beyond that temperature for which designed, and more particularly to electronic temperature controllers of the millivoltmeter type.

Frequently, control instruments are supplied by the manufacturer for standard temperature ranges which exceed the maximum safe operating temperatures of furnaces.

It is an object of this invention to prevent this inadvertent operation and thereby prevent the furnaces from being burnt out causing a substantial rehabilitation which is unnecessarily expensive both in time and money. In carrying out this invention, electronic temperature controllers of the millivoltmeter type are used which operate on the principle that when an electronic oscillator is detuned, the associated vacuum tube plate current will change, which in turn operates a solenoid for effecting the cut-off of the power input to the equipment.

In the drawings which are merely illustrative of a preferred embodiment of the inventor Fig. 1 shows a perspective of the arrangement of this invention showing only the oscillator tuning coils of the electrical control circuit;

Figure 1:
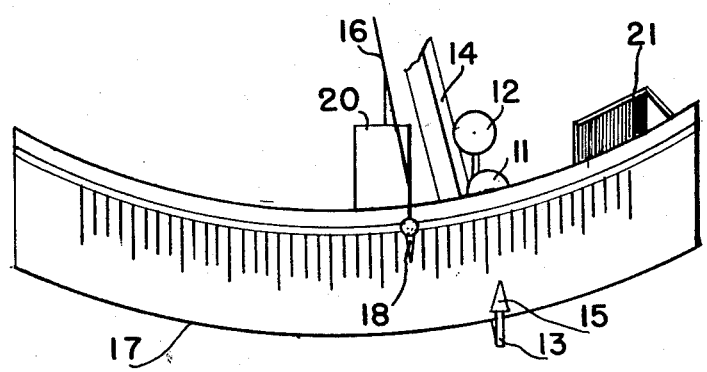

In the drawings, the coils 11 and 12 are mounted in parallel spaced relationship on the arm 14 of the adjustable preset indicator 13 which has a pointer 15 in positional relationship with a fixed temperature scale 17 in such a manner that the pointer 15 in any of its operative positions bears a constant fixed distance relationship to the scale 17 which in Fig. 1 is shown as an arc of a circle. The temperature indicating mechanism likewise has a protruding arm 16 with a pointer 18 in cooperative relationship with the same scale 17. The operating positions of the pointers 15 and 18 are observable from the same position.

Figure 2:
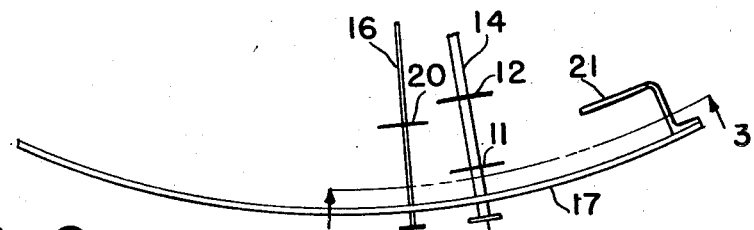
Fig. 2 is a top view of Fig. 1.
Figure 3:
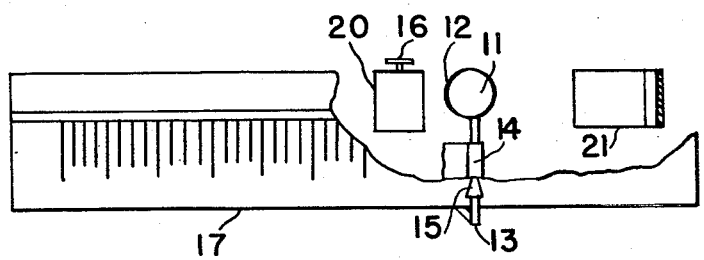
Fig. 3 is a front view of Figs. 1 and 2 with a portion of the scale broken away for clearance.

A plate 20, preferably metallic, is suspended from the temperature arm 16 in such a manner that within the operable temperature range of the associated furnaces, its arcuate path of travel intercepts at all times the line between the coils 11 and 12. Similarly, a second plate 21 likewise can be interposed between the coils 11 and 12 when the present preset indicator is moved to an extreme position on the scale 17. However, the path of the movable plate 20 does not conflict with or intercept that of plate 21 which is fixedly mounted relative to the scale 17. As best shown in Fig. 2, plates 20 and 21 are both free to simultaneously intercept the space between coils 11 and 12 when transposed. Plate 21 is usually mounted at the time of installation in such a manner that it prevents the operation of the associated furnaces beyond its rated maximum capacity, thereby preventing any damages resulting from the presetting of the indicator 15 beyond the rated maximum.

Figure 4:
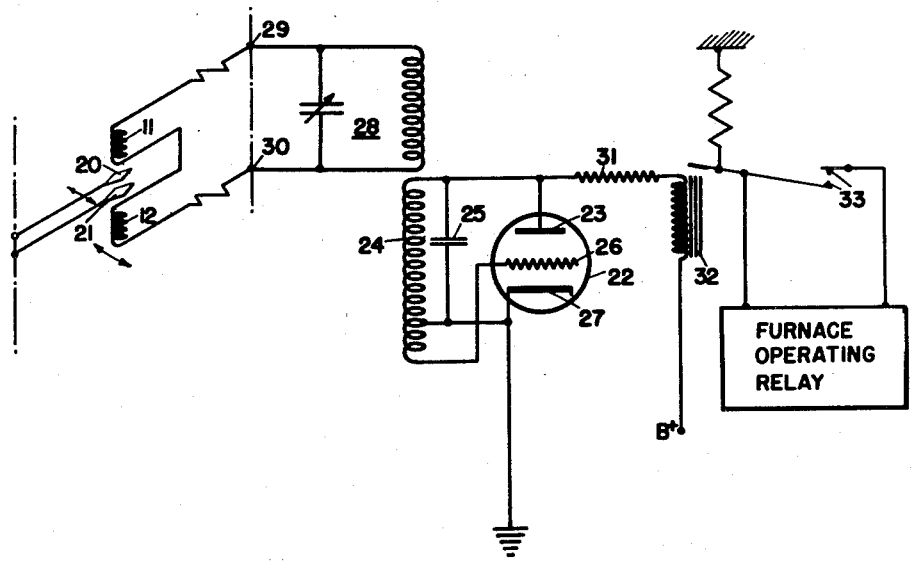
Fig. 4 is a schematic diagram of the controller circuit.

In Figure 4 is shown one embodiment of a circuit for the control of the furnace. Coil 24 and condenser 25 comprise an oscillating circuit in conjunction with tube 22, plate 23, grid 26 and grounded cathode 27. Tuned circuit 28 is connected to axially aligned coils 11 and 12 movable between the metal plates 20 and 21. The plate circuit of the tube 22 includes resistor 31, and magnetic switch 32 with spring loaded contacts 33 connected to the power supply of the furnace.

In operation of the device of this invention, when it is desired to operate the furnace to a certain temperature, the preset indicator is set at that temperature on the scale. This position, in starting, will always be to the right of the temperature indicating arm 16 and pointer 18 as viewed in the present figures of the drawings. In the event that the desired temperature is beyond the maximum operating temperature of the furnace, plate 21 will intersect the field between the coils 11 and 12 and prevent the operation of the furnace. In no case can the furnace be operated with the preset arm 14 positioned to the left of the temperature arm 16 since in this position the operating current is cut off.

While the above description and the drawings have defined a preferred embodiment of the invention it is not desired to be strictly limited thereto since other arrangements of parts and other constructions could be effected, such as mounting the coils on the temperature recording arm, the field intercepting plate on the preset arm and the maximum temperature limiting plate on a post independent of the scale structure—all a purely relative relationship—without departing fro the spirit or scope of the invention as defined by the herewith appended claims.

The invention described herein may be manufactured and used by or for the Government of the United States of America for governmental purposes without the payment of any royalties thereon or therefor.

What is claimed is:

1. In a furnace electronic temperature controller of the millivoltmeter type, the combination of a device responsive to the temperature of the furnace, a plate mounted thereon for indicating the temperature gradients, a preset temperature indicator, a pair of coils in the input circuit of said furnace controller mounted thereon, the plate of said temperature responsive indicator arranged to be interposed between the coils of said preset indicator for interrupting the input to said furnaces, and a second plate for interposition between the coils of said preset mechanism when said coils are positioned beyond the maximum operating range of said furnace.

2. In a furnace electronic temperature controller of the millivoltmeter type, a pair of coils in the input circuit of said furnace controller axially mounted on an arm of a preset temperature indicator, a device responsive to the temperature of said furnace, a plate mounted on said temperature responsive device in cooperative relationship with said coils, and a second plate mounted permanently relative to said movable temperature responsive device in cooperative relationship with said coils and adapted to intercept the inductive fields of said coils to interrupt the input of said furnace controller and prevent the operation of said furnace above a predetermined temperature.

3. In an electric furnace electronic temperature controller of the millivoltmeter type, comprising a visible temperature scale, a temperature responsive device readable and movable relative to said scale, a plate mounted on said temperature responsive device, a preset indicator adjustably mounted relative to said scale, a pair of parallel positioned coils for controlling the input to said electric furnace mounted on said preset indicator in spaced cooperative relationship with said plate, a second plate likewise in cooperative spaced relationship with the paths of said coils mounted on said scale for preventing input to said furnace when said preset indicator is positioned beyond the maximum operating temperature of said electric furnace.

4. An electronic temperature controller of the millivoltmeter type adapted, in conjunction with a temperature indicating instrument which is responsive to the temperature attained in heating apparatus, to regulate the operating temperature of and to limit the maximum temperature attainable by the heating apparatus comprising, a controller circuit, a pair of coils connected in said circuit and mounted in spaced axial alignment on an adjustably movable arm in said instrument, a plate mounted on a second arm in said instrument adapted to intersect the space between the axially aligned coils said second arm in said instrument movably responsive to changes in temperature in the heating apparatus and a second plate permanently mounted in the temperature indicating instrument also adapted to intersect the space between the axially aligned coils, each of said plates adapted to coact with said coils and said controller circuit connected thereto to regulate and to limit, respectively, the operating temperature of the heating apparatus.

RICHARD A. TERRY.

REFERENCES CITED

The following references are of record in the file of this patent:

UNITED STATES PATENTS

| Number | Name | Date |
| --- | --- | --- |
| 2,228,163 | Cohen | Jan. 7, 1941 |
| 2,234,184 | MacLaren | Mar. 11, 1941 |